(12) United States Patent
Shamir et al.

(10) Patent No.: US 12,093,729 B2
(45) Date of Patent: Sep. 17, 2024

(54) DISTRIBUTED TASK PROGRESS REPORT

(71) Applicant: VAST DATA LTD., Tel Aviv (IL)

(72) Inventors: Ohad Shamir, Tel Aviv (IL); Oren Ashkenazi, Tel Aviv (IL); Avi Goren, Tel Aviv (IL); Asaf Weissman, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 589 days.

(21) Appl. No.: 17/305,052

(22) Filed: Jun. 29, 2021

(65) Prior Publication Data

US 2022/0413904 A1 Dec. 29, 2022

(51) Int. Cl.
*G06F 9/48* (2006.01)
(52) U.S. Cl.
CPC ............ *G06F 9/4881* (2013.01); *G06F 9/485* (2013.01)
(58) Field of Classification Search
CPC .................................................. G06F 9/4881
See application file for complete search history.

(56) References Cited

U.S. PATENT DOCUMENTS 7,451,445 B1 * 11/2008 Eppstein ............... G06F 9/4843
  718/103
2015/0261570 A1 * 9/2015 Goldman .................. G06F 9/50
  718/102

* cited by examiner

*Primary Examiner* — Charlie Sun
(74) *Attorney, Agent, or Firm* — Reches Patents

(57) ABSTRACT

A method for determining a progress of an execution of a task, the method may include accessing only a portion of a shared task status data structure that (a) is associated with the task, wherein the task is executed by a first plurality of compute elements, and (b) comprises multiple hierarchical levels; wherein an entry of a certain hierarchical level represents an aggregate progress associated with multiple entries of the another hierarchical level; the certain hierarchical level is higher than the other hierarchical level; and determining the progress of the execution of the task based on a content of the portion.

20 Claims, 6 Drawing Sheets

DISTRIBUTED TASK PROGRESS REPORT

TECHNICAL FIELD

The present disclosure generally relates to the field of data storage, and more particularly to a distributed task progress report.

BACKGROUND

Storage system can perform lengthy tasks that may last hours, particularly when vast amounts of data are involved. Such tasks may include migration, backup, defragmentation, rebuild, various estimations of data capacity, scanning filesystem trees for various purposes, and the like.

Monitoring the progress of a lengthy task is required either for reporting to the user of the system or for internal processes that are dependent on the completion and/or the outcome of the task.

Executing lengthy tasks may be shared by multiple compute resources (e.g., processors, servers, compute nodes), so as to accelerate the execution of the task and to balance the load imposed by performing the task.

Monitoring the progress of a task that is handled by multiple compute resources may be time consuming in itself, especially when there is a multitude of involved compute resources.

SUMMARY

There may be provide a storage system, a method and a non-transitory computer readable medium for distributed task progress report.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
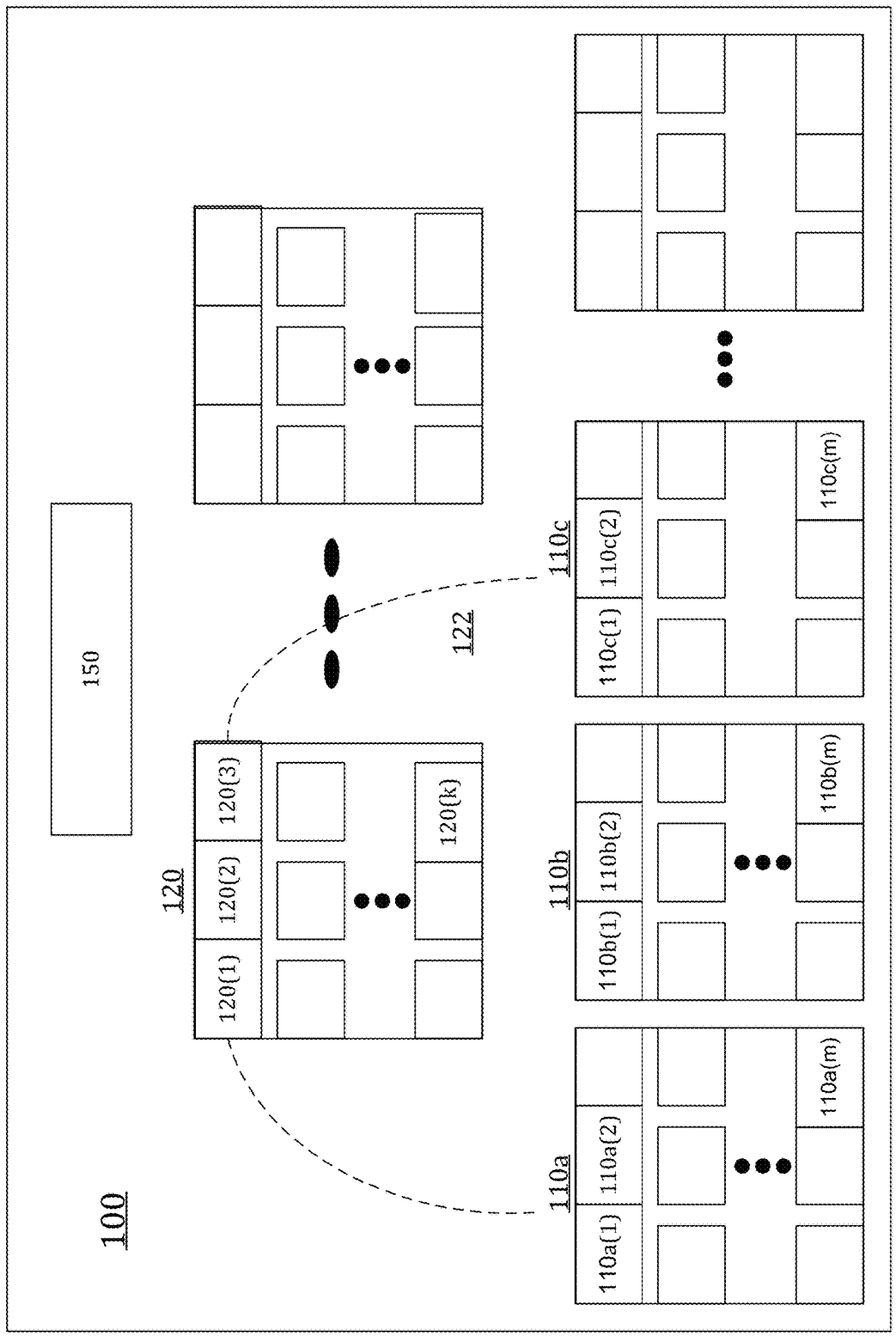
FIG. 1 illustrates an example of a shared memory.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute entity, a compute element and a compute node, that are used interchangeably. The compute node may be a server, computer, a cloud container, and the like. Any one of the compute entity and compute element can be a compute node, processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The present system, method and non-transitory computer readable medium are for determining a progress of an execution of a task that is being executed by multiple compute entities.

The progress of the execution of the task may be represented by a shared task status data structure that is associated with the task and may include multiple hierarchical levels. Each entry in the lowest level represents progress of a specific compute entity. An entry of a certain hierarchical level, above the lowest level, represents an aggregate progress associated with multiple entries of the another hierarchical level, wherein the certain hierarchical level is higher than the other hierarchical level.

The shared task status structure may be updated by compute entities of a storage system. A compute entity may update at least a compute entity entry that is associated with that compute entity.

In order to determine the progress of an execution of a task there is no need to read the entire shared task status structure—but only a portion (for example—up to 0.1, 0.2, 0.3, 0.4, 0.5, 0.6, 0.7, 0.8, 0.9, 1, 2, 3, 4, 5, 6, 7, 8, 9, 10, 11, 12, 15, 16 percent) of the entire shared task status structure. This portion may store information about the aggregate progress in the execution of the task. Aggregate (or summation) in the sense that it provides an indication about a progress of the execution task by compute nodes (even all the compute nodes) assigned to execute the task.

The shared task status structure is associated with a task and there may be additional shared task status structure associated with additional tasks.

A first plurality of compute entities of a storage system may be assigned for executing portions of a task. The portions of the task are split among a first plurality of compute entities.

A task progress report may be required, while the task is being executed by the first plurality of compute entities. When a very large number of compute entities is involved, e.g., dozens of thousands or more, monitoring all the compute entities and summing the total values involved in the task progress report is not applicable or is time consuming.

According to embodiments of the present disclosure, the compute entities are grouped, and the progress report is provided in a hierarchy manner. Each group of compute entities may be assigned with a group memory portion (for example a group entry) in a shared memory that is accessible to the compute entities. The group memory portion may belong to the shared task status structure. Each compute entity is assigned with a compute entity entry (also referred to as a progress cell) to which it writes progress information. The progress cell is a sub-portion within the group memory portion assigned to the group. The group memory portion includes a progress cell per each compute entity. The size of the group or the size of the group memory portion may be determined arbitrarily, or may be determined according to system characteristics, e.g., a size of a logical block or a physical block that is optimal to be used by one access command.

A progress summation is also written to the shared memory, summing progress information from all the members of the group, as well as summing the progress of several groups.

In addition to writing the progress in the progress cell, each compute entity may update the progress summation. Since the progress summation may be stored in a different area of the shared memory or in a different memory portion that requires an additional access, the update of the progress summation may be performed in a different (e.g., lower) frequency rather than upon each time the progress cell is updated. The frequency of the update of the progress summation may be determined according to predefined criteria, e.g., periodically, or when the progress exceeds a certain threshold comparing to the previous reported progress of the group or of the compute entity, for example, when a change of 5% or more in the progress has been achieved, compared to the previous report.

The progress summation may be a total summation that represents the progress of the entire task, or may be an intermediate level, where each group has an entry for group progress summation. An upper level of progress summation may be a total summation or a higher grouping level summation.

FIG. 1 illustrates a shared memory 100 that is accessible by all the compute entities that execute a shared task. The share memory stores a shared task status structure per task.

Each group of compute entities is assigned with a group memory portion, such as group memory portions 110a, 110b and 110c. Each group memory portion includes progress cells, one progress cell per each compute node of the group. For example, a first compute entity in the first group is assigned with a progress cell 110a(1), where it updates its progress. A second compute entity in the first group is assigned with a progress cell 110a(2) and a m'th compute entity in the first group is assigned with a progress cell 110a(m), where m is the number of compute entities in the first group. The progress cell (or the compute entity entry) may be a small addressable unit of memory, e.g., a byte, word, long word, etc. The group memory portion may be a physical or logical block that can be read or written, in its entirety, by the compute entities, using a single access request.

An upper level (highest hierarchical level) includes progress summation level 122, that includes memory portions with summation cells for the lower level groups. For example, a memory portion 120 includes summation cells fork lower level groups, e.g., summation cell 120(1) includes the summation of the first group, i.e., the summation of progress cells in group memory portion 110a, summation cell 120(2) includes the summation of progress cells in group memory portion 110b, summation cell 120(3) includes the summation of progress cells in group memory portion 110c, and summation cell 120(k) includes the summation of progress cells in a k'th group memory portion (not shown).

The upmost level includes a total sum that sums all the groups, such as total summation 150. If an upper level application (e.g., an application that initiated the distributed task execution or an application that relied on the completion of the distributed task), needs to monitor the progress, it may only monitor the total sum.

When a certain compute entity in a certain group updates its progress cell, it may update the summation cell that corresponds to the group and may further update summation cells in one or more upper levels. For example, when the first compute entity updates its progress cell 110a(1), it may also update the summation cell 120(1) of its group. The compute entities may update the summation cells upon each update of their progress cells. However, since the update of the summation cell impose further 10 operations of reading and writing the cell, and may impose using locking (since there are many compute entities in the group that updates the summation cell), it may be preferred to update an upper level summation cell less frequently. For example, it may be determined that a compute entity updates an upper level summation cell only if the amount of progress since the last update is above a certain progress threshold, e.g., 5% change. The progress may refer to the progress of the specific compute node or the progress of the group. The compute entity may update all the upper level summation cells that corresponds to the group and affected by the change in the progress of the compute entity, according to the same or different rules that applied to updating the group summation.

The summation calculation may be according to predefined rules and formulas, e.g., according to a weight assigned to each member in a group, according to a weight assigned to the group comparing to other groups, etc. The formula of the summing may be predefined and may include: sum, average, maximum, minimum, or any other formula.

Figure 2:
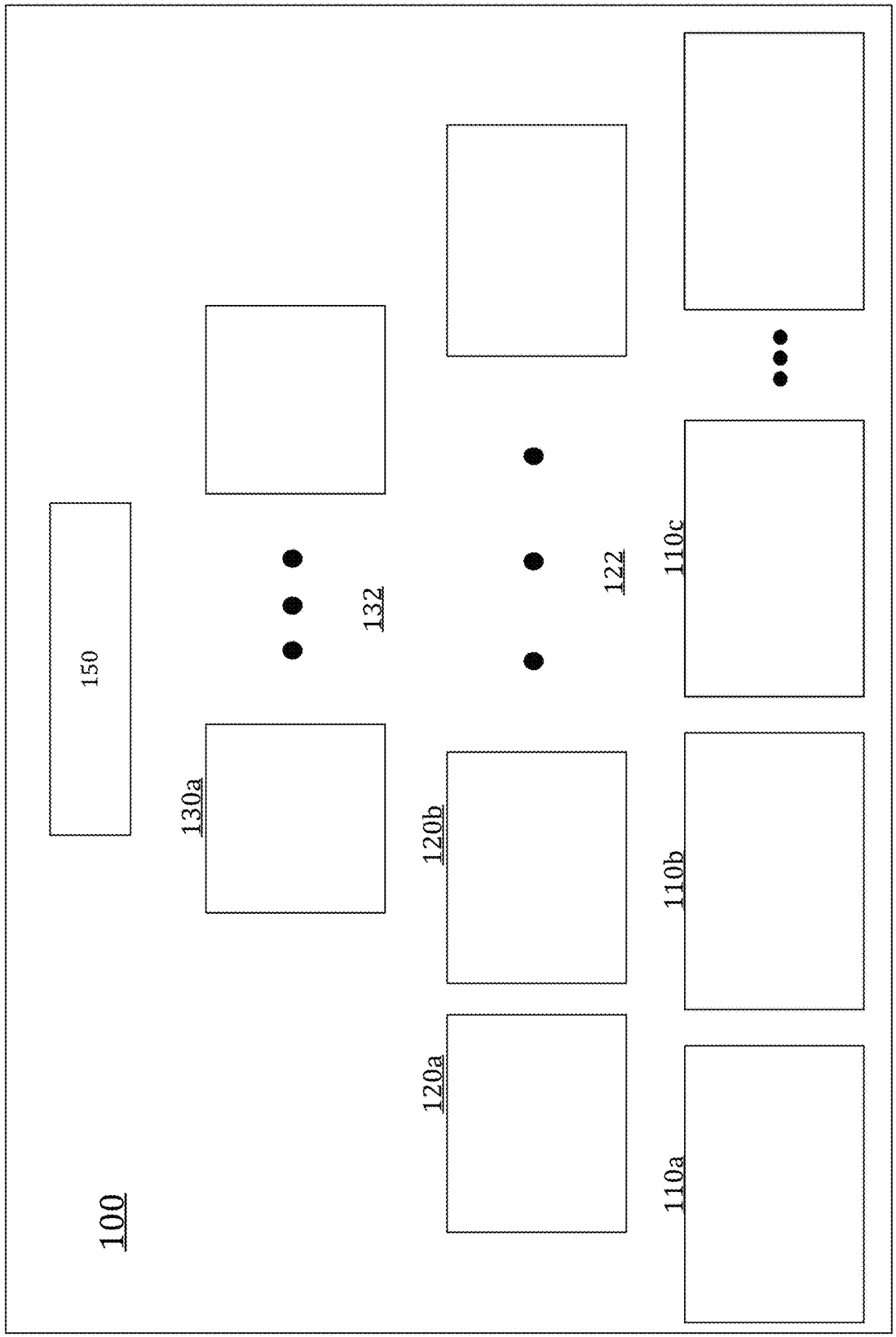
FIG. 2 illustrates an example of a shared memory.

FIG. 2 illustrates a hierarchical summation that uses an additional summation level 132, where each memory portion sums multiple groups of the lower level 122. There are typically less memory portions in level 132 comparing to the lower level 122.

Figure 3:
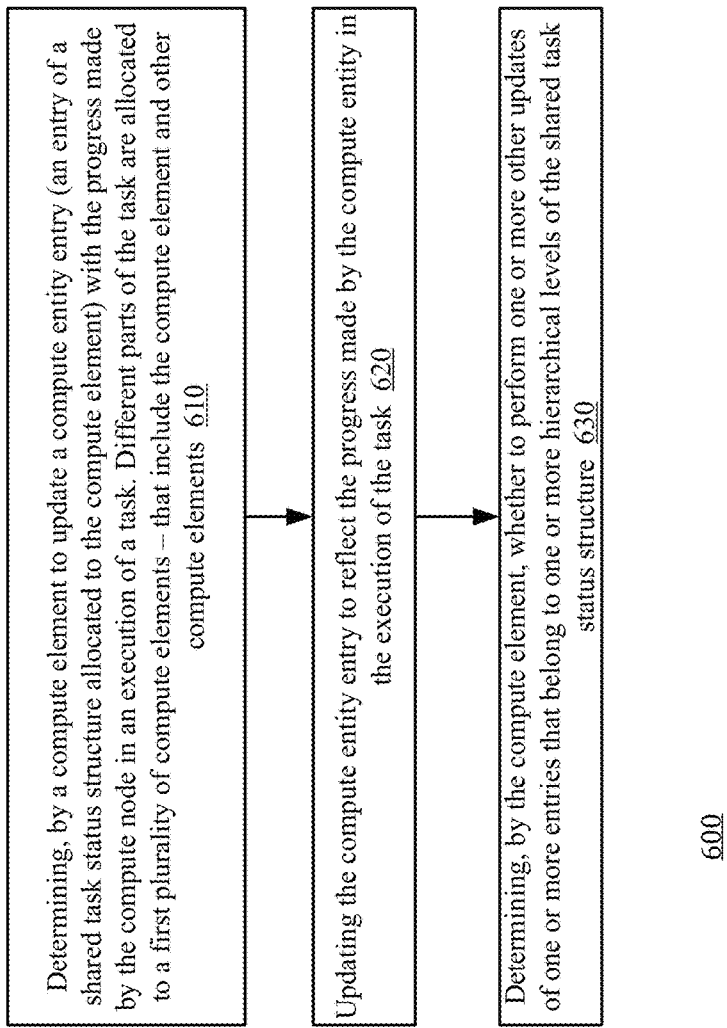
FIG. 3 illustrates an example of a method.

FIG. 3 illustrates method 600 for reporting a progress of an execution of a task.

Method 600 may start by step 610 of determining, by a compute element to update a compute entity entry (an entry of a shared task status structure allocated to the compute element) with the progress made by the compute node in an execution of a task. Different parts of the task are allocated to different compute elements of a first plurality of compute elements—that include the compute element and other compute elements.

The shared task status structure is associated with the task. There may be different shared task status structures for different tasks.

The shared task status structure may include multiple hierarchical levels. It is assumed, for simplicity of explanation, that the compute entity entry is used for summing updates regarding the progress made by the compute element, and that the compute entity entry belongs to the lowest hierarchical level of the shared task status structure.

The determining may be triggered in any manner—for example when a predefined progress is obtained, when a predetermined report point of time, arrived, as a response to a request from another entity—and the like.

Step 610 may be followed by step 620 of updating the compute entity entry to reflect the progress made by the compute entity in the execution of the task.

Step 620 may be followed by step 630 of determining, by the compute element, whether to perform one or more other updates of one or more entries that belong to one or more hierarchical levels of the shared task status structure.

Step 630 may be based on one or more higher hierarchy level update rules. For example—the compute entity may be required to update an entry of a higher hierarchical level every time it updates its compute entity entry, may update only under certain conditions, and the like. For example—there may be one or more compute entities (or any other resource of the storage system that may or may not participate in the execution of the task) that perform updates of the higher hierarchical levels.

Step 630 may be followed by step 640 of performing one or more other updates—when determining to do so.

For example—compute entity entry may be associated with a group entry. The group entry is indicative of a progress in executing the task by the compute entity and some other compute entities.

There may be multiple groups and the aggregate progress of the multiple groups may be reflected in a highest hierarchical level of the shared task status structure—or in an intermediate hierarchical level of the shared task status structure.

The following example refers to a shared task status structure that has three shared hierarchical levels—the lowest hierarchical level includes compute element entries, the second hierarchical level includes group entries and the highest hierarchical level includes a summation of all groups. There may be more than three multiple hierarchical levels, and there may be other allocations of hierarchical levels per compute entities.

Figure 4:
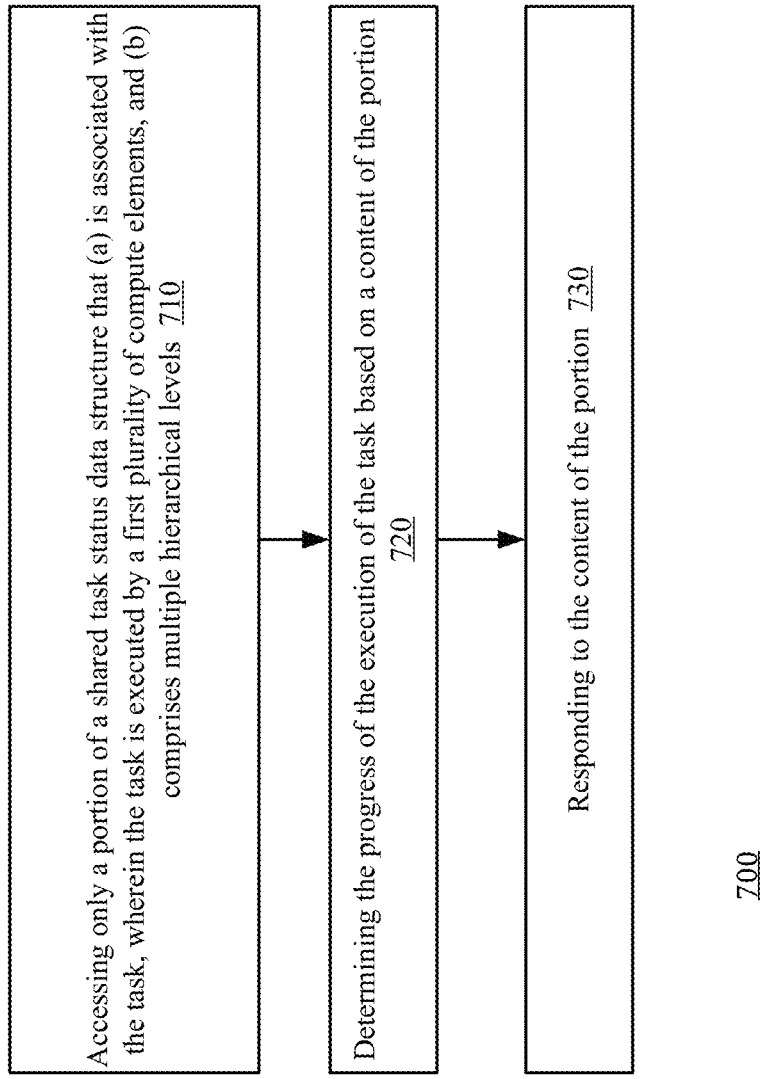
FIG. 4 illustrates an example of a method.

FIG. 4 illustrates a method 700 for determining a progress of an execution of a task.

Method 700 may start by step 710 of accessing only a portion of a shared task status data structure that (a) is associated with the task, wherein the task is executed by a first plurality of compute elements, and (b) comprises multiple hierarchical levels.

An entry of a certain hierarchical level represents an aggregate progress associated with multiple entries of the another hierarchical level. The certain hierarchical level is higher than the other hierarchical level.

The portion of a shared task status data structure may belong to the highest hierarchical level of the multiple hierarchical levels. Reading only the portion, dramatically reduces the time requires for determining the progress. This is very beneficial when the storage system include a vast number of compute nodes.

Step 710 may be followed by step 720 of determining the progress of the execution of the task based on a content of the portion. The portion may include a value indicative of the progress of the task that may indicate the amount of work that was completed, e.g., the number of operations have been completed, the number of files, objects or filesystem entities that were processed (e.g., scanned, copied, compressed, etc.), the amount of data that was processed, the percentage of the task that was completed.

Step 720 may be followed by step 730 of responding to the content of the portion. This may include for example initiating a storage operation that depends on the progress (e.g., completion) of the task, reporting the progress to a management station that presents the task progress to a user, load balancing, allocating a second plurality of compute elements to another task, executing any other storage system management operation, and/or executing and/or delaying and/or cancelling an execution of any storage system related operation.

The multiple compute elements may be arranged in a hierarchical manner. For example—all CPUs of a compute node may represent one level and the compute nodes may belong to another level. The number of hierarchical levels of the first plurality of compute elements may equal to or may differ from the number of the multiple hierarchical levels.

Figure 5:
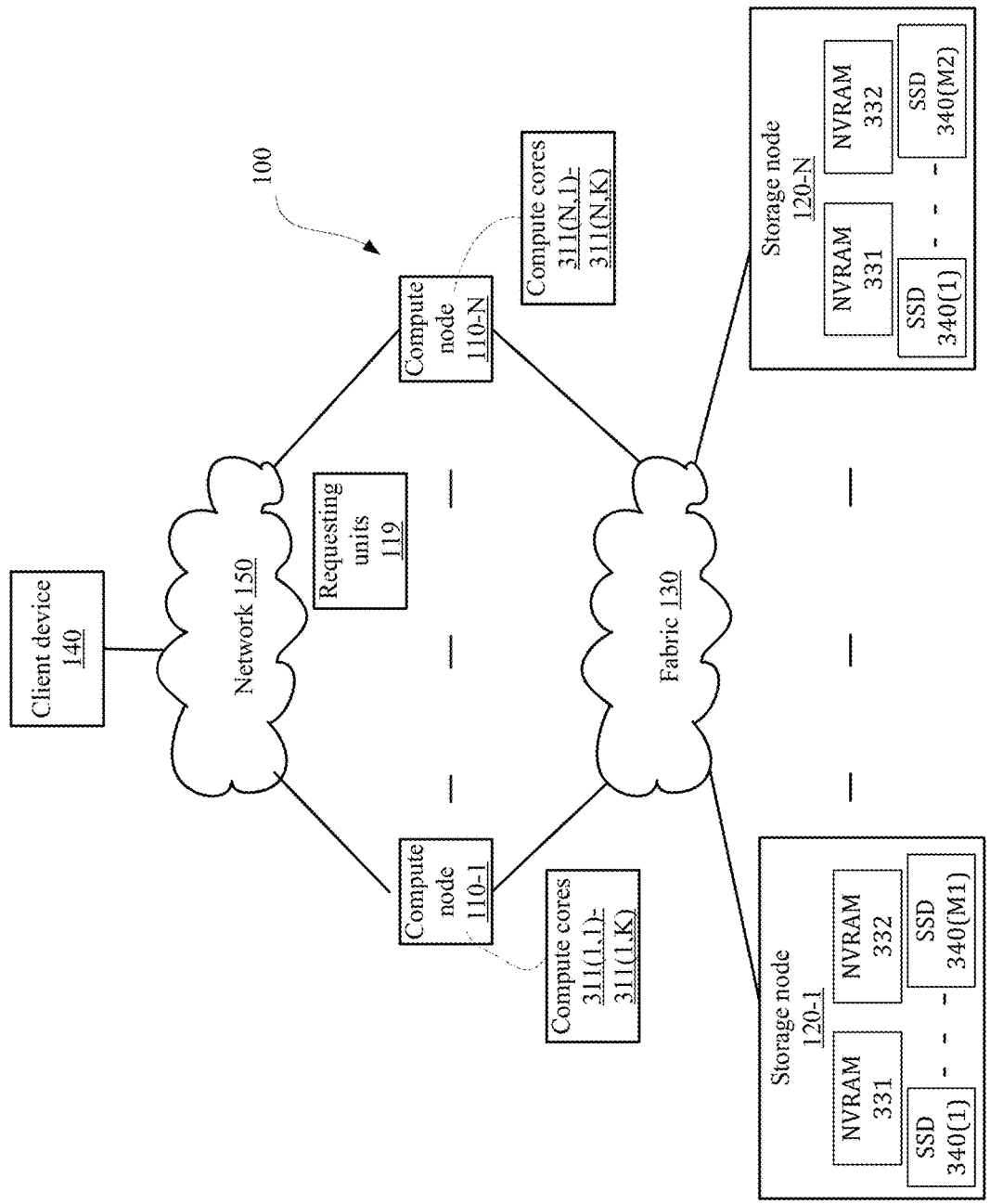
FIGS. 5 and 6 are examples of storage systems.
Figure 6:
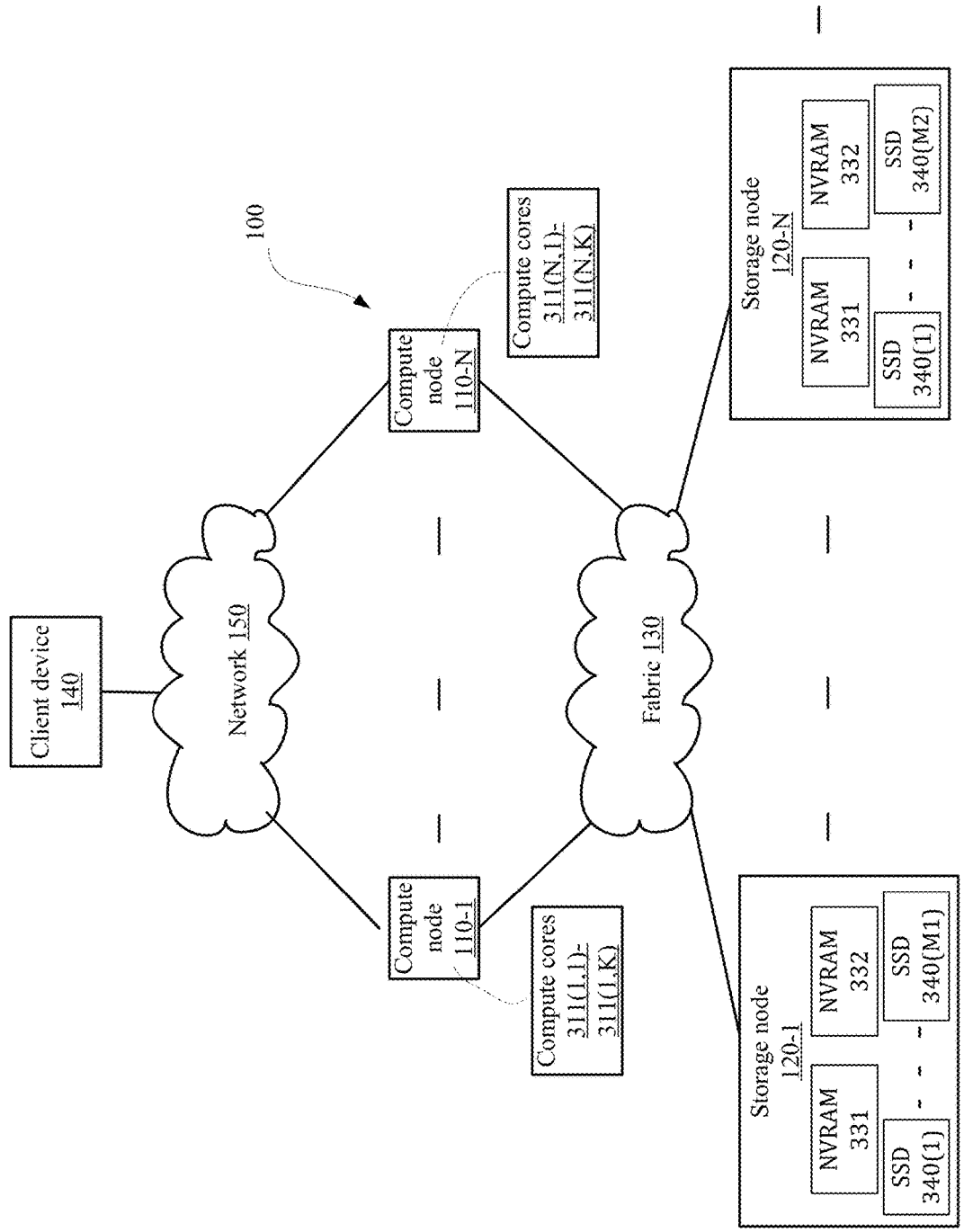

FIGS. 5 and 6 show examples diagram of a storage system 100 according to the disclosed embodiments.

The storage system of FIG. 5 differs from the storage system of FIG. 6 by including querying entity 119 that may request to learn the progress of a task. In FIG. 6 these requesting units are not shown—and the compute nodes may also act as requesting units. The querying entity may be an application that initiated the distributed task or a process that is dependent on the completion or other sort of progress of the distributed task.

The storage system 100 includes a number of N compute nodes 110-1 through 110-N (hereinafter referred to individually as a compute node 110 and collectively as compute nodes 110, merely for simplicity purposes, N is an integer equal to or greater than 1). The compute nodes include (or may execute) multiple compute cores each—see for example compute cores 311(1,1)-311(1,K) and compute cores 311(N,1)-311(N,K).

The storage system 100 also includes a number of M storage nodes storage node 120-1 through 120-M (hereinafter referred to individually as a storage node 120 and collectively as storage nodes 120, merely for simplicity purposes, M is an integer equal to or greater than 1). The computer nodes 110 and the storage nodes 120 are connected through a communication fabric 130. M may equal N or may differ from N.

In an embodiment, a compute node 110 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 110 does not require any dedicated hardware.

A compute node 110 is configured to perform tasks related to the management of the storage nodes 120. In an embodiment, each compute node 110 interfaces with multiple client devices such as a client device 140 (or an application installed therein) via a network 150. To this end, a compute node 110 is configured to receive requests (e.g., read or write requests) and promptly serve these requests in a persistent manner. The network 150 may be, but is not limited to, the Internet, the world-wide-web (WWW), a local area network (LAN), a wide area network (WAN), and the like.

In an embodiment, a compute node 110 is configured to interface with different protocols implemented by the client devices or applications (e.g., TCP/IP, HTTP, FTP, various filesystem protocols, etc.) and to manage the read and write operations to the storage nodes 120. The compute node 110 is further configured to translate the protocol commands into a unified structure (or language). Then, each compute node 110 is also configured to logically address and map all elements stored in the storage nodes 120.

Further, each compute node 110 may maintain the logical operations of elements and the relationships between the elements (for example, directory trees) and an element attribute (e.g., metadata) via state stored on the storage nodes 120. An element may include a file, a directory, an object, and the like. The mapping and addressing of the elements allow the compute node 110 to maintain the exact physical locations of the elements in the storage nodes 120.

In an embodiment, to efficiently read and write data to the storage nodes 120 from the physical level, each compute node 110 performs a number of processes including data reduction, data resiliency, and Flash memory management actions (e.g., defrag, wear leveling, and so on).

It should be noted that each compute node 110 may operate in the same manner as all other compute nodes 110. In a case of a failure, any compute node 110 can replace the failed node. Further, each compute node may control and manage one or mode storage nodes 120 regardless of the specific architecture of the storage nodes 120. Therefore, there is no coupling between specific compute nodes 110 and specific storage nodes 120. As such, compute nodes can be added to the system 100 without increasing the number of storage nodes (or their capacity), and vice versa, storage nodes can be added without increasing the number of compute nodes 110.

The storage nodes 120 provide the storage and state in the system 100. To this end, each storage node 120 may include a plurality of SSDs, such as SSDs 340, for example storage node 120-1 includes M1 SSDs 340(1)-340(M1). Each storage node further includes fast accessed memory such as NVRAM 331 and 332 of FIG. 3A. The shared task status data structure may be stored in either a volatile memory or non-volatile memory within the storage node, for example in one or more of the NVRAM devices that are accessible to all the compute nodes.

The storage nodes 120 may be configured to have the same capacity as each other or different capacities from each other. In an embodiment, the data stored in each storage node 120 is made redundant internally within the storage node, made redundant at a different storage node, or both.

A storage node 120 may be configured to communicate with the compute nodes 110 over the communication fabric 130. It should be noted that each compute node 110 can communicate with each storage node 120 over the communication fabric 130. There may not be a direct coupling between a compute node 110 and storage node 120.

In the embodiment, the communication fabric 130 may include an Ethernet fabric, an InfiniBand fabric, and the like. Specifically, the communication fabric 130 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 140 is part of a compute node 110. In such a deployment, the system 100 does not communicate with an external network, e.g., the network 150. It should be further noted that the communication between the compute nodes 110 and the storage nodes 120 is facilitated over the fabric 130. It should be further noted that the compute nodes 120 can communicate with each other over the fabric 130. The fabric 130 is a shared fabric.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for determining a progress of an execution of a task, the method comprises:

updating, by a compute element of a first plurality of compute elements, a compute entity entry of a shared task status data structure, with a current progress made by the compute element in relation to the execution of the task; wherein the compute entity entry belongs to the shared task status data structure and is allocated to the compute element;

determining, by the compute element, whether to update a group entry of the shared task status data structure; wherein the group entry stores information about a progress of a group of compute elements that includes the compute element and some other compute elements of the first plurality of compute elements;

updating, in the group entry, a value representing an aggregate progress of the group, when determining to update the group entry;

accessing only a portion of the shared task status data structure that (a) is associated with the task, wherein the task is executed by the first plurality of compute elements, and (b) comprises multiple hierarchical levels; wherein an entry of a certain hierarchical level represents an aggregate progress associated with multiple entries of the another hierarchical level; the certain hierarchical level is higher than the other hierarchical level; and determining the progress of the execution of the task based on a content of the portion.

2. The method according to claim 1 wherein the portion is included in a highest hierarchical level of the shared task status data structure.

3. The method according to claim 1 comprising performing a storage system related operation in response to the progress.

4. The method according to claim 1 comprising delaying an execution of a storage system related operation in response to the progress.

5. The method according to claim 1 comprising allocating at least one other task to a second plurality of compute elements in response to the progress.

6. The method according to claim 1 wherein the shared task status data structure is updated by at least some of the first plurality of compute elements.

7. The method according to claim 1 comprising updating the shared task status data structure by at least some of the first plurality of compute elements.

8. The method according to claim 1 wherein compute elements of the first plurality of compute elements are arranged in a hierarchical manner.

9. The method according to claim 8 wherein a number of hierarchical levels of the first plurality of compute elements differs from the number of the multiple hierarchical levels.

10. The method according to claim 1 wherein the portion belongs to a highest hierarchical level of the multiple hierarchical levels, wherein the highest hierarchical level stores a summation of progress of the task by all compute elements of the first plurality of compute elements.

11. A non-transitory computer readable medium for determining a progress of an execution of a task, the non-transitory computer readable medium stores instructions for:

updating, by a compute element of a first plurality of compute elements, a compute entity entry of a shared task status data structure, with a current progress made by the compute element in relation to the execution of the task; wherein the compute entity entry belongs to the shared task status data structure and is allocated to the compute element;

determining, by the compute element, whether to update a group entry of the shared task status data structure; wherein the group entry stores information about a progress of a group of compute elements that includes the compute element and some other compute elements of the first plurality of compute elements;

updating, in the group entry, a value representing an aggregate progress of the group, when determining to update the group entry;

accessing only a portion of the shared task status data structure that (a) is associated with the task, wherein the task is executed by the first plurality of compute elements, and (b) comprises multiple hierarchical levels; wherein an entry of a certain hierarchical level represents an aggregate progress associated with multiple entries of the another hierarchical level; the certain hierarchical level is higher than the other hierarchical level; and determining the progress of the execution of the task based on a content of the portion.

12. The non-transitory computer readable medium according to claim 11 wherein the portion is included in a highest hierarchical level of the shared task status data structure.

13. The non-transitory computer readable medium according to claim 11 that stores instructions for performing a storage system related operation in response to the progress.

14. The non-transitory computer readable medium according to claim 11 that stores instructions for delaying an execution of a storage system related operation in response to the progress.

15. The non-transitory computer readable medium according to claim 11 that stores instructions for allocating at least one other task to a second plurality of compute elements in response to the progress.

16. The non-transitory computer readable medium according to claim 11 wherein the shared task status data structure is updated by at least some of the first plurality of compute elements.

17. The non-transitory computer readable medium according to claim 11 that stores instructions for updating the shared task status data structure by at least some of the first plurality of compute elements.

18. The non-transitory computer readable medium according to claim 11 wherein compute elements of the first plurality of compute elements are arranged in a hierarchical manner.

19. The non-transitory computer readable medium according to claim 18 wherein a number of hierarchical levels of the first plurality of compute elements differs from the number of the multiple hierarchical levels.

20. The non-transitory computer readable medium according to claim 11 wherein the portion belongs to a highest hierarchical level of the multiple hierarchical levels, wherein the highest hierarchical level stores a summation of progress of the task by all compute nodes of the first plurality of compute node.

* * * * *